United States Patent
Kojima (10) Patent No.: US 12,169,330 B2
(45) Date of Patent: Dec. 17, 2024

(54) OPERATION DISPLAY DEVICE AND IMAGE FORMING APPARATUS

(71) Applicant: Reo Kojima, Kanagawa (JP)

(72) Inventor: Reo Kojima, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 18/386,272

(22) Filed: Nov. 2, 2023

(65) Prior Publication Data

US 2024/0152002 A1    May 9, 2024

(30) Foreign Application Priority Data

Nov. 8, 2022 (JP) .................. 2022-178609

(51) Int. Cl.
*G02F 1/1333* (2006.01)
*H04N 1/00* (2006.01)

(52) U.S. Cl.
CPC ...... *G02F 1/13338* (2013.01); *G02F 1/13332* (2021.01); *G02F 1/133325* (2021.01); *H04N 1/00411* (2013.01)

(58) Field of Classification Search
CPC .......................... G02F 1/13338; H04N 1/00411
USPC ........................................................ 349/12
See application file for complete search history.

(56) References Cited

U.S. PATENT DOCUMENTS

| | | | |
|---|---|---|---|
| 2007/0040816 A1* | 2/2007 | Toyomaki | G06F 3/0412 345/174 |
| 2015/0219831 A1* | 8/2015 | Tanaka | G02B 5/0278 362/333 |
| 2021/0168246 A1 | 6/2021 | Kamei et al. | |
| 2023/0288625 A1 | 9/2023 | Aoyama et al. | |

FOREIGN PATENT DOCUMENTS

| | | |
|---|---|---|
| JP | 2005-077551 A | 3/2005 |
| JP | 2006-235082 A | 9/2006 |
| JP | 2017-004257 A | 1/2017 |
| JP | 2022-030026 A | 2/2022 |

* cited by examiner

*Primary Examiner* — Charles S Chang
(74) *Attorney, Agent, or Firm* — XSENSUS LLP (57) ABSTRACT

An operation display device includes: a touch panel including a transparent base and an electrostatic capacitance sensor sheet, the transparent base having an operation surface in a front surface thereof to which or with which an operation body approaches or comes into contact, the sensor sheet being provided on a back surface of the transparent base to detect the approach or the contact of the operation body; a liquid crystal panel facing a back surface of the touch panel; an outer cover covering a portion of the touch panel other than a front surface of the touch panel; and a sealing member sealing a gap between the touch panel and the liquid crystal panel, the outer cover including a spacer between the touch panel and the liquid crystal panel, and the sensor sheet being not to be interposed between the transparent base and the spacer.

17 Claims, 4 Drawing Sheets

OPERATION DISPLAY DEVICE AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2022-178609, filed on Nov. 8, 2022, in the Japan Patent Office, the entire disclosure of which is hereby incorporated by reference herein.

BACKGROUND

Technical Field

The present disclosure relates to an operation display device and an image forming apparatus.

Related Art

A touch panel operation display device is known as an operation display device mounted on a copier, a printer, a facsimile machine, or a multifunction peripheral of the copier, printer, and facsimile machine.

The touch panel operation display device includes a touch panel and a liquid crystal panel or the like disposed on a back surface of the touch panel. Methods of bonding the touch panel and the liquid crystal panel include a direct bonding method and an air gap method. The direct bonding method is a method in which the touch panel and the liquid crystal panel are entirely bonded to each other, whereas the air gap method is a method in which the touch panel and the liquid crystal panel are partially bonded to each other with a space interposed therebetween.

The direct bonding method is mainly employed in a smartphone, a tablet terminal, or the like. However, in the case of the direct bonding method, when a defect occurs in the touch panel or the liquid crystal panel, the touch panel and the liquid crystal panel are replaced together, thereby increasing replacement cost. In contrast, the air gap method has an advantage of reducing the replacement cost because the touch panel and the liquid crystal panel can be individually replaced. However, in the case of the air gap method, to prevent a foreign object from entering between the touch panel and the liquid crystal panel, the gap between the touch panel and the liquid crystal panel is sealed with a sealing member such as a sponge.

In the air gap method that uses such a sealing member, when the distance between the touch panel and the liquid crystal panel is less than a predetermined distance due to a dimensional error, an attachment error, or the like of a component, the sealing member is excessively pressed. Hence, the touch panel may be pushed out by the elastic force of the sealing member, and the touch panel may rise with respect to an outer cover. In particular, in a so-called full-flat structure in which the entire front surface of the touch panel is exposed, the front surface of the touch panel is not held by the outer cover. Hence, a rise of the touch panel is likely to occur.

SUMMARY

Embodiments of the present disclosure provide an operation display device including a touch panel including a transparent base and an electrostatic capacitance sensor sheet, the transparent base having an operation surface in a front surface of the transparent base to which or with which an operation body approaches or comes into contact, the sensor sheet being provided on a back surface of the transparent base to detect the approach or the contact of the operation body to or with the operation surface; a liquid crystal panel disposed so as to face a back surface of the touch panel; an outer cover covering a portion of the touch panel other than a front surface of the touch panel; and a sealing member sealing a gap between the touch panel and the liquid crystal panel. The outer cover includes a spacer interposed between the touch panel and the liquid crystal panel. The sensor sheet is disposed so as not to be interposed between the transparent base and the spacer.

Embodiments of the present disclosure provide an image forming apparatus including an image forming device to form an image on a recording medium; and the above-described operation display device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference signs as far as distinguishable, and redundant descriptions are omitted.

Figure 1:
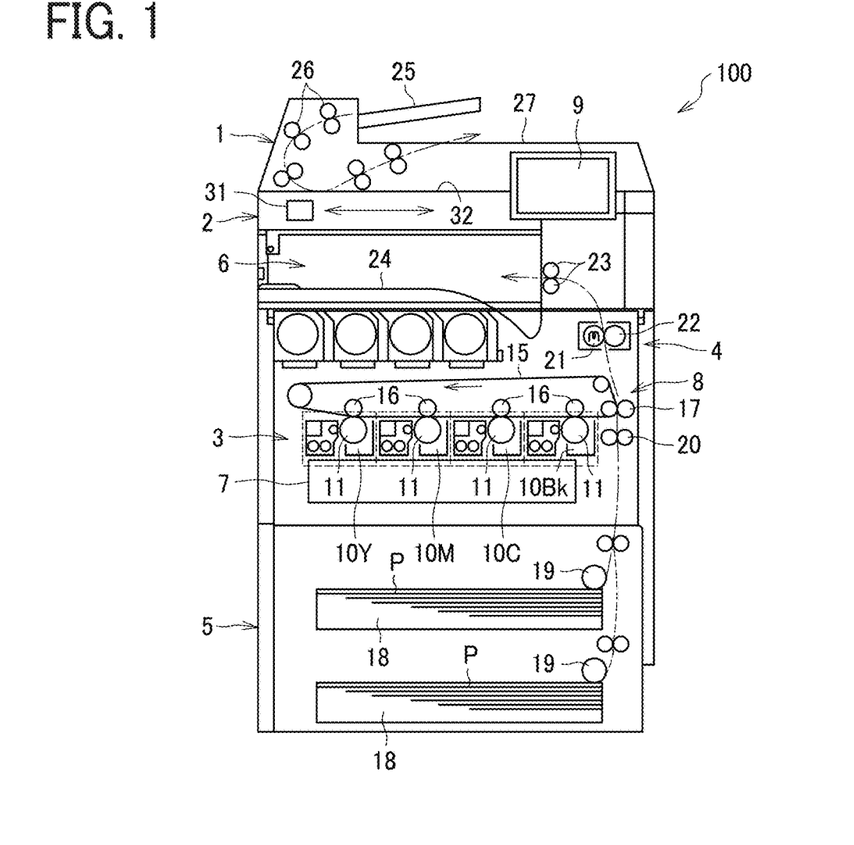
FIG. 1 is a schematic view of an image forming apparatus according to an embodiment of the present disclosure.
Figure 2:
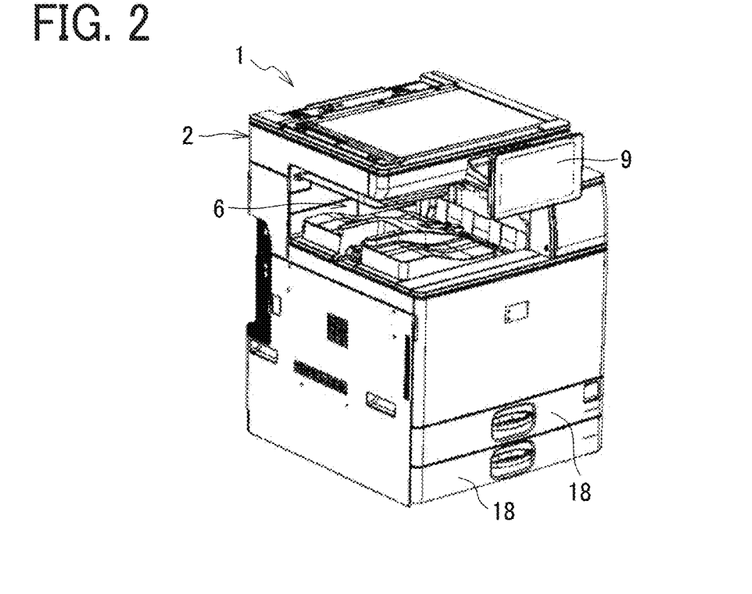
FIG. 2 is an external perspective view of the image forming apparatus according to the present embodiment.

FIG. 1 is a schematic view of an image forming apparatus according to an embodiment of the present disclosure. FIG. 2 is an external perspective view of the image forming apparatus according to the present embodiment. In the following description, the "image forming apparatus" may be a printer, a copier, a scanner, a facsimile machine, or a multifunction peripheral having at least two of printing, copying, scanning, and facsimile functions. "Image formation" used in the following description represents formation of an image having meaningful information such as characters and figures, and formation of an image not having meaningful information such as a pattern. A general arrangement and an operation of the image forming apparatus according to the present embodiment will be described referring to FIGS. 1 and 2.

As illustrated in FIGS. 1 and 2, an image forming apparatus 100 according to the present embodiment includes a document conveyance device 1 that conveys a document, an image reading device 2 that reads an image of the document, an image forming device 3 that forms an image on a recording medium, a fixing device 4 that fixes the image to the recording medium, a recording medium feeding device 5 that feeds the recording medium, and a recording medium ejection device 6 that ejects the recording medium.

The document conveyance device 1 includes a document feeding tray 25 on which a document is placed, a plurality of conveyance rollers 26 that convey the document from the document feeding tray 25 to a contact glass 32 of the image reading device 2, and a document ejection tray 27 to which the document is ejected.

The image reading device 2 includes the contact glass 32 and an optical scanning unit 31 that reads an image of a document on the contact glass 32. The optical scanning unit 31 includes a light source that irradiates the document with light, and a charge-coupled device (CCD) that reads an image from reflected light of the light with which the document has been irradiated. Alternatively, another image sensor, such as a contact image sensor (CIS), may be used instead of the CCD as means for reading an image. The optical scanning unit 31 is moved in a direction indicated by arrows in FIG. 1 (sub-scanning direction) by a carrier serving as a driving device, forms an image on an image forming element via a lens, and captures the image of the document. The image reading device 2 does not have to be installed in the image forming apparatus 100, and may be installed in a place distant from the image forming apparatus 100 and can communicate with the image forming apparatus 100 in a wired or wireless manner.

The image forming device 3 includes four image forming units 10Y, 10M, 10C, and 10Bk, an image writing device 7 that writes electrostatic latent images onto respective photoconductors 11 included in the image forming units 10Y, 10M, 10C, and 10Bk, and a transfer device 8 that transfers the images onto a recording medium.

The image forming units 10Y, 10M, 10C, and 10Bk have basically the same configurations except that the image forming units 10Y, 1M, 10C, and 10Bk house toners (developers) of different colors of yellow, magenta, cyan, and black corresponding to color-separation components of a color image. Specifically, each of the image forming units 10Y, 10M, 10C, and 10Bk includes the photoconductor 11 serving as an image bearer that bears an image on a surface of the photoconductor 11, a charging member that charges the surface of the photoconductor 11, a developing device that supplies a toner serving as a developer to the surface of the photoconductor 11 to form a toner image, and a cleaning device that cleans the surface of the photoconductor 11.

The image writing device 7 includes, for example, a laser diode (LD) that irradiates the surface of the photoconductor 11 with light (laser beam). The image writing device 7 modulates a drive signal of the LD in accordance with image data, and writes an electrostatic latent image on the photoconductor 11 with the light emitted from the LD.

The transfer device 8 includes an intermediate transfer belt 15, four primary transfer rollers 16, and a secondary transfer roller 17. The intermediate transfer belt 15 is an endless belt and is supported in a stretched manner by a plurality of rollers. The four primary transfer rollers 16 are provided inside the intermediate transfer belt 15. Each of the primary transfer rollers 16 is in contact with a corresponding one of the photoconductors 11 via the intermediate transfer belt 15, thereby forming a primary transfer portion (primary transfer nip) between the intermediate transfer belt 15 and the corresponding photoconductor 11. The secondary transfer roller 17 is in contact with an outer peripheral surface of the intermediate transfer belt 15 and forms a secondary transfer portion (secondary transfer nip).

The fixing device 4 includes a fixing rotational body 21 that is heated by a heating source such as a heater, and a pressure rotational body 22 that is pressed against the fixing rotational body 21 to form a fixing nip.

The recording medium feeding device 5 includes a sheet feeding cassette 18 that houses sheets P serving as recording media, and a sheet feeding roller 19 that sends out a sheet from the sheet feeding cassette 18. Although the "recording medium" will be described as a "sheet" below, the "recording medium" is not limited to a sheet of paper. Examples of the "recording medium" include, but are not limited to, a sheet of paper, an overhead projector (OHP) transparency, fabric, a metal sheet, a plastic film, and a prepreg sheet obtained by impregnating carbon fibers with a resin in advance. The sheet of paper may be a sheet of plain paper, thick paper, thin paper, coated paper such as art paper, or tracing paper. Examples of the sheet of paper include, but are not limited to, a postcard and an envelope in addition to the aforementioned kinds of sheets of paper.

The recording medium ejection device 6 includes a pair of sheet ejection rollers 23 that eject a sheet and a sheet ejection tray 24 on which the ejected sheet is placed.

A printing operation of the image forming apparatus 100 according to the present embodiment will be described referring to FIG. 1.

When image formation is instructed, the image reading device 2 reads an image on a document.

The document is a document that is conveyed from the document feeding tray 25 to the contact glass 32, or a document placed on the contact glass 32. An image of the document that passes over the contact glass 32 or the document placed on the contact glass 32 is read by the optical scanning unit 31 of the image reading device 2, and read image data is sent to the image forming device 3.

In the image forming device 3, the photoconductor 11 of each of the image forming units 10Y, 10M, 10C, and 10Bk starts rotating, and a charging member charges the surface of the photoconductor 11 to have a uniform high potential. Then, the image writing device 7 irradiates the surface (charged surface) of each photoconductor 11 with light based on image information on the document read by the image reading device 2. Thus, the potential of a portion irradiated with the light decreases, and an electrostatic latent image is formed on the surface of each photoconductor 11. The developing device supplies a toner to the electrostatic latent image to form a toner image on each photoconductor 11.

When the toner images formed on the respective photoconductors 11 reach the primary transfer portions (the positions of the primary transfer rollers 16) by the rotation of the photoconductors 11, the toner images are sequentially transferred onto the rotating intermediate transfer belt 15 so as to overlap with one another. Thus, a full-color toner image is formed on the intermediate transfer belt 15. Alternatively, any one of the image forming units 10Y, 10M, 10C, and 10Bk may be used to form a monochrome image, or any two or three of the image forming units 10Y, 10M, 10C, and 10Bk may be used to form a two-color image or a three-color image. After the toner images are transferred from the photoconductors 11 to the intermediate transfer belt 15, the cleaning devices remove residual toners or the like from the photoconductors 11.

The toner image on the intermediate transfer belt 15 is conveyed to the secondary transfer portion (the position of the secondary transfer roller 17) by the rotation of the intermediate transfer belt 15, and is transferred onto a sheet at the secondary transfer portion. The sheet is a sheet fed from the sheet feeding cassette 18, and is sent out from the sheet feeding cassette 18 by the rotation of the sheet feeding roller 19. The sent-out sheet is temporarily stopped by a pair of timing rollers 20, and then is conveyed by the timing rollers in synchronization with a timing at which the toner image on the intermediate transfer belt reaches the secondary transfer portion.

The sheet is conveyed to the fixing device 4, and the toner image on the sheet is heated and pressed by the fixing rotational body 21 and the pressure rotational body 22 to fix the toner image to the sheet. Then, the sheet is ejected by the sheet ejection rollers 23 to the outside of the apparatus, and is placed on the sheet ejection tray 24. Thus, a series of image forming operations is ended.

A configuration of an operation display device included in the image forming apparatus 100 according to the present embodiment will be described below.

As illustrated in FIGS. 1 and 2, the image forming apparatus 100 according to the present embodiment includes an operation panel 9 serving as an operation display device on which an operator such as a user performs various operations related to the printing operation (image forming operation) and on which information related to the printing operation is displayed. The operation panel 9 is provided on an upper portion of a front surface of the image forming apparatus 100. The "front surface" of the image forming apparatus 100 in this case is a surface on a side where an operator stands when the operator performs a normal operation. "Front surfaces" of the image forming apparatus and various components used in the following description also represent surfaces on the same side. The angle of the operation panel 9 is changeable by a tilt mechanism so that the operator can visually recognize the operation panel 9 at any angle.

Figure 3:
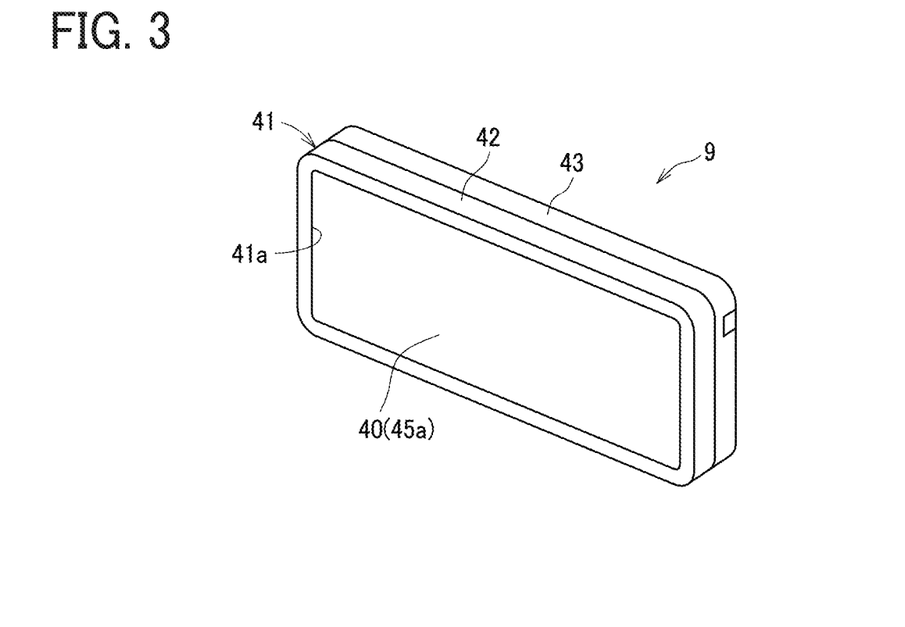
FIG. 3 is an external perspective view of an operation panel according to the present embodiment.
Figure 4:
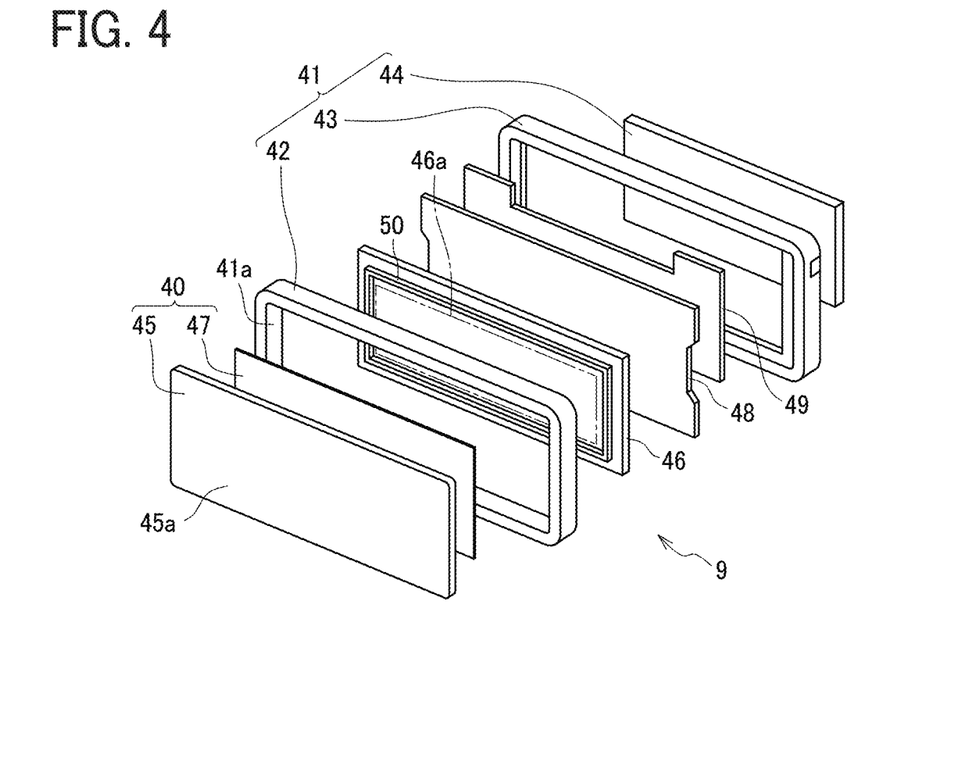
FIG. 4 is an exploded perspective view of the operation panel according to the present embodiment.

FIG. 3 is an external perspective view of the operation panel 9 according to the present embodiment. FIG. 4 is an exploded perspective view of the operation panel 9.

As illustrated in FIG. 3, the operation panel 9 according to the present embodiment is formed in a flat rectangular-parallelepiped shape, and a front surface of an outer cover 41 included in the operation panel 9 is provided with a rectangular window portion 41a through which an operation surface 45a of a touch panel 40 is exposed.

As illustrated in FIG. 4, the operation panel 9 includes the outer cover 41, the touch panel 40, a liquid crystal panel 46, a sealing member 50, a bracket 48, and a printed circuit board (PCB) 49.

The outer cover 41 includes a front cover 42, a rear cover 43, and a back surface cover 44. The front cover 42, the rear cover 43, and the back surface cover 44 are each made of a resin material or the like. The front cover 42 is a frame-shaped member having the window portion 41a through which the operation surface 45a of the touch panel 40 is exposed. In the present embodiment, a front surface including the operation surface 45a of the touch panel 40 entirely has a full-flat structure disposed in the same plane as a front surface of the front cover 42.

The front cover 42 covers a portion of the touch panel 40 other than the front surface of the touch panel 40, and holds various internal members of a sensor sheet 47, the sealing member 50, the liquid crystal panel 46, the bracket 48, and the PCB 49 so as to cover the various internal members. In a state in which the internal members are held by the front cover 42, the rear cover 43 is fitted to the rear of the front cover 42, and the back surface cover 44 is attached so as to cover a back surface of the rear cover 43, thereby housing various internal components in the outer cover 41.

The touch panel 40 is an electrostatic capacitance touch panel that detects an operation position (touch position) using a change in electrostatic capacity generated when an operation body, such as a finger of a hand of an operator or a touch pen, approaches to or comes into contact with the operation surface 45a. Specifically, the touch panel 40 includes a transparent base 45 having the operation surface 45a in a front surface of the transparent base 45, and the sensor sheet 47 attached to a back surface opposite to the front surface (operation surface 45a) of the transparent base 45. The transparent base 45 is made of, for example, a transparent rectangular glass plate. In contrast, the sensor sheet 47 is formed of, for example, two sheets (projection electrostatic capacitance sensor sheets) in which electrodes are arranged so as to be orthogonal to each other.

When the operation body approaches to or comes into contact with the operation surface 45a of the transparent base 45, the sensor sheet 47 detects a change in electrostatic capacity due to the approach or the contact.

The liquid crystal panel 46 is a unit in which a thin and lightweight liquid crystal panel (LCD) body, which is difficult to be mounted as a single body, into a securing frame. The liquid crystal panel 46 is disposed so as to face a back surface side opposite to the operation surface 45a (front surface) of the touch panel 40, and has a display area 46a for displaying an image, on a front surface of the liquid crystal panel 46. The sealing member 50 made of an elastic member such as a sponge is disposed between the touch panel 40 and the liquid crystal panel 46. The sealing member 50 is continuously disposed along entire outer peripheral portions of the touch panel 40 and the liquid crystal panel 46 to prevent a foreign object from entering between the touch panel 40 and the liquid crystal panel 46.

The bracket 48 serving as a supporting member and the PCB 49 for exchanging electric signals are disposed on a back surface side of the liquid crystal panel 46. The PCB 49 is supported by the bracket 48 together with the liquid crystal panel 46. The bracket 48 is fastened to the front cover 42 with a screw or the like, and hence the liquid crystal panel 46 and the PCB 49 are held by the front cover 42 via the bracket 48.

A disadvantage of a rise of the touch panel will be described based on a configuration of a comparative example illustrated in FIG. 8.

Figure 8:
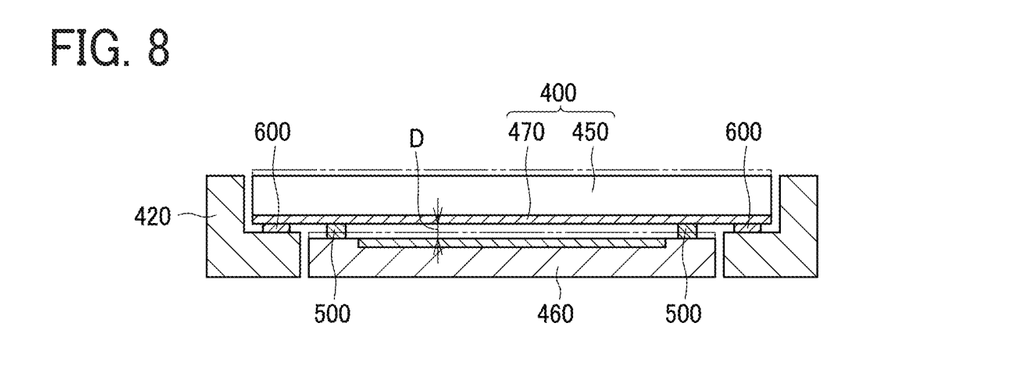
FIG. 8 is a schematic cross-sectional view of an operation panel according to a comparative example.

As illustrated in FIG. 8, in the comparative example, a touch panel 400 including a sensor sheet 470 attached to a back surface of a transparent base 450 is attached to a front cover 420 with a double-sided adhesive tape 600 interposed therebetween. A liquid crystal panel 460 is disposed on a back surface side of the touch panel 400 with a gap interposed therebetween. A sealing member 500 that seals the gap between the touch panel 400 and the liquid crystal panel 460 is interposed between the touch panel 400 and the liquid crystal panel 460.

A distance (a thickness of an air layer) D between the touch panel 400 and the liquid crystal panel 460 is set to a predetermined distance (size) with regard to operability and visibility. However, the distance D between the touch panel 400 and the liquid crystal panel 460 may be smaller than the predetermined distance due to a dimensional error, an attachment error, or the like of a component. For example, as indicated by two-dot chain lines in FIG. 8, when the thickness of the liquid crystal panel 460 is larger than a thickness set in advance, the liquid crystal panel 460 approaches to a back surface of the touch panel 400, and hence the distance D between the touch panel 400 and the liquid crystal panel 460 decreases. Thus, the sealing member 500 is excessively pressed, and the touch panel 400 is pushed out by the elastic force of the sealing member 500 as indicated by the two-dot chain lines and rises with respect to the front cover 420. In particular, as illustrated in FIG. 8, in the case of a so-called full-flat structure in which an entire front surface of the touch panel 400 is exposed, the front surface of the touch panel 400 is not held by the front cover 420, and hence a rise of the touch panel is likely to occur.

In contrast, the operation panel according to the embodiment of the present disclosure employs the following configuration to suppress a rise of the touch panel. The configuration of the operation panel according to the present embodiment will be described below in detail.

Figure 5:
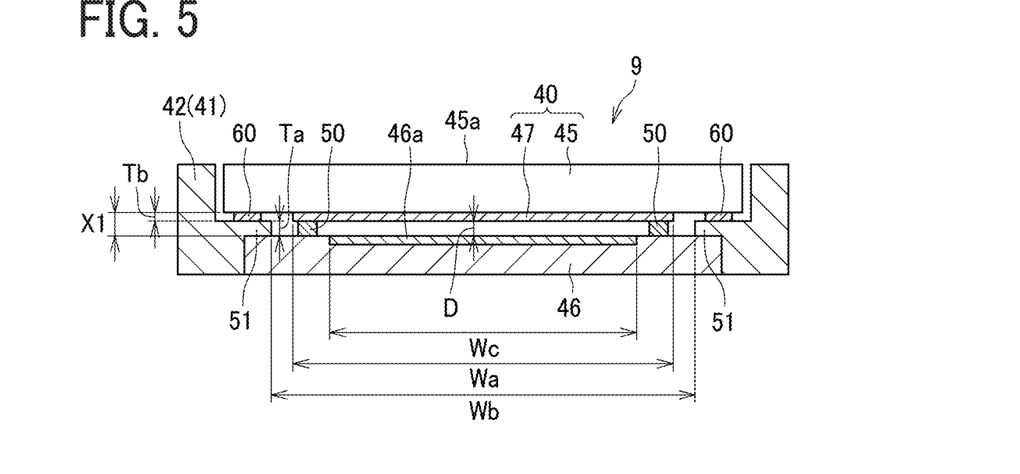
FIG. 5 is a schematic cross-sectional view of the operation panel according to the present embodiment.

FIG. 5 is a schematic cross-sectional view of the operation panel 9 according to the present embodiment.

As illustrated in FIG. 5, in the operation panel 9 according to the present embodiment, the front cover 42 included in the outer cover 41 includes a spacer 51 that is interposed between the touch panel 40 and the liquid crystal panel 46 and that holds a distance D between the touch panel 40 and the liquid crystal panel 46. The spacer 51 is a protrusion that protrudes inward from a rectangular frame-shaped edge of the front cover 42. The spacer 51 may be provided continuously over the entire periphery of the edge of the front cover 42, or may be partially provided at a portion of the edge of the front cover 42.

A back surface of the touch panel 40 is attached and secured to a front surface of the spacer 51 via a double-sided pressure sensitive adhesive tape 60. In contrast, the front surface of the liquid crystal panel 46 is disposed in contact with a back surface of the spacer 51. In FIG. 5, the touch panel 40 is disposed in a state slightly spaced apart from the front surface of the spacer 51 via the double-sided pressure sensitive adhesive tape 60 (non-contact state); however, the touch panel 40 may be disposed in direct contact with the front surface of the spacer 51. As illustrated in FIG. 5, the touch panel 40 may be disposed in direct contact with the back surface of the spacer 51, or may be disposed in indirect contact with the spacer 51 via a double-sided pressure sensitive adhesive tape or the like.

As described above, the touch panel 40 and the liquid crystal panel 46 are disposed so as to sandwich the spacer 51, and the spacer 51 is interposed between the touch panel 40 and the liquid crystal panel 46, thereby holding the distance (a thickness of an air layer) D between the touch panel 40 and the liquid crystal panel 46. That is, since the spacer 51 is defined by a portion of the front cover 42 made of a material having a rigidity that is high to a certain degree (for example, having a rigidity higher than that of the sealing member 50), elastic deformation such as compression is less likely to occur, and a change in the distance D between the touch panel 40 and the liquid crystal panel 46 can be suppressed.

Since the front cover 42 includes such a spacer 51, in the embodiment of the present disclosure, a rise of the touch panel 40 with respect to the front cover 42 can be suppressed even when the thickness of the liquid crystal panel 46 is larger than the predetermined thickness.

Figure 6:
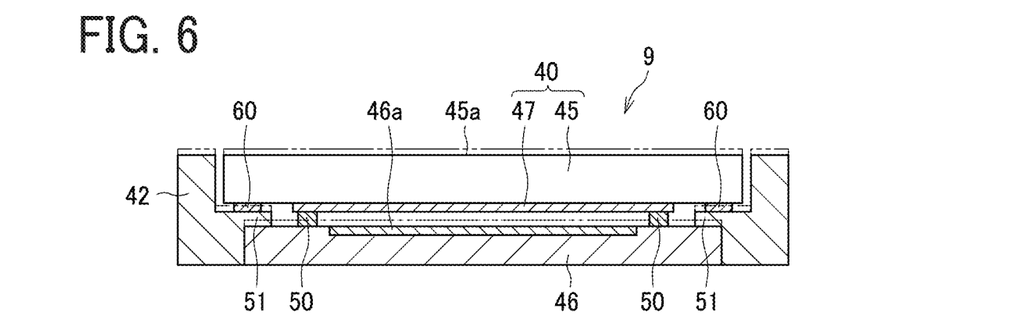
FIG. 6 is a view illustrating an effect of suppressing a rise of the touch panel according to the present embodiment.

That is, in the present embodiment, as indicated by two-dot chain lines in FIG. 6, even when the thickness of the liquid crystal panel 46 is larger than the predetermined thickness and consequently the position of the front surface of the liquid crystal panel 46 is displaced upward in FIG. 6, the spacer 51 is also pushed up by the displacement of the liquid crystal panel 46. Hence, the touch panel 40 is also pushed up together with the spacer 51.

In contrast, in the comparative example illustrated in FIG. 8, when the liquid crystal panel 460 becomes thick, the touch panel 400 is pushed up by the liquid crystal panel 460, whereas the front cover 420 does not follow the change in the thickness of the liquid crystal panel 460. Thus, the front cover 420 is not pushed up, and a rise of the touch panel 400 occurs to protrude forward with respect to the front cover 420.

As described above, in the case of the embodiment of the present disclosure, when the liquid crystal panel 46 becomes thick, the front cover 42 is pushed up together with the touch panel 40 to follow the change in the thickness of the liquid crystal panel 46, and hence the touch panel 40 can be prevented from protruding forward, and a rise of the touch panel 40 with respect to the front cover 42 can be suppressed. With the configuration according to the embodiment of the present disclosure, a rise of the touch panel can be suppressed even in the operation panel having the full-flat structure.

Figure 7:
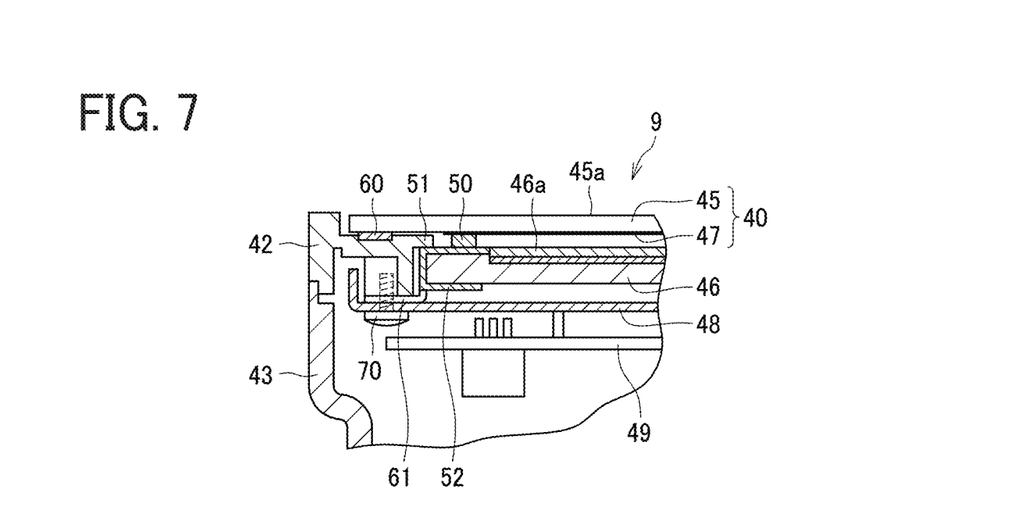
FIG. 7 is a cross-sectional view illustrating a specific configuration of the operation panel according to the present embodiment.

FIG. 7 is a cross-sectional view illustrating a specific configuration of the operation panel 9 according to the present embodiment.

As illustrated in FIG. 7, in the embodiment of the present disclosure, the liquid crystal panel 46 is provided with a fastened portion 61 that is fastened to the front cover 42 (outer cover 41) to precisely position the liquid crystal panel 46 with respect to the spacer 51. The fastened portion 61 includes, for example, a protruding piece provided so as to protrude from a ring-shaped frame (bezel) 52 disposed around the display area 46a of the liquid crystal panel 46. The fastened portion 61 is disposed on a back surface side of the front cover 42, and the fastened portion 61 is fastened to the front cover 42 with a screw 70, thereby securing the liquid crystal panel 46 to the front cover 42. At this time, the liquid crystal panel 46 receives the fastening force of the screw 70 and is pressed against the back surface of the spacer 51, thereby precisely positioning the liquid crystal panel 46 with respect to the spacer 51. Thus, the precision of the distance D between the touch panel 40 and the liquid crystal panel 46 is improved, thereby obtaining stable operability and visibility. In the example illustrated in FIG. 7, the fastened portion 61 is fastened to the front cover 42 together with the bracket 48; however, the fastened portion 61 and the bracket 48 may be fastened by different screws.

In the electrostatic capacitance operation panel 9 according to the embodiment of the present disclosure, to further improve the operability and the visibility, it is desirable to decrease the distance D between the touch panel 40 and the liquid crystal panel 46. A method of decreasing the distance D is, for example, a method of decreasing a thickness Ta (see FIG. 5) of the spacer 51. However, decreasing the thickness Ta of the spacer 51 leads to disadvantages such as a decrease in strength of the spacer 51 and an increase in processing difficulty of the spacer 51.

Thus, in the embodiment of the present disclosure, to decrease the distance D between the touch panel 40 and the liquid crystal panel 46 while the thickness Ta of the spacer 51 is ensured, the sensor sheet 47 is not interposed between the transparent base 45 of the touch panel 40 and the spacer 51 as illustrated in FIG. 5.

Figure 9:
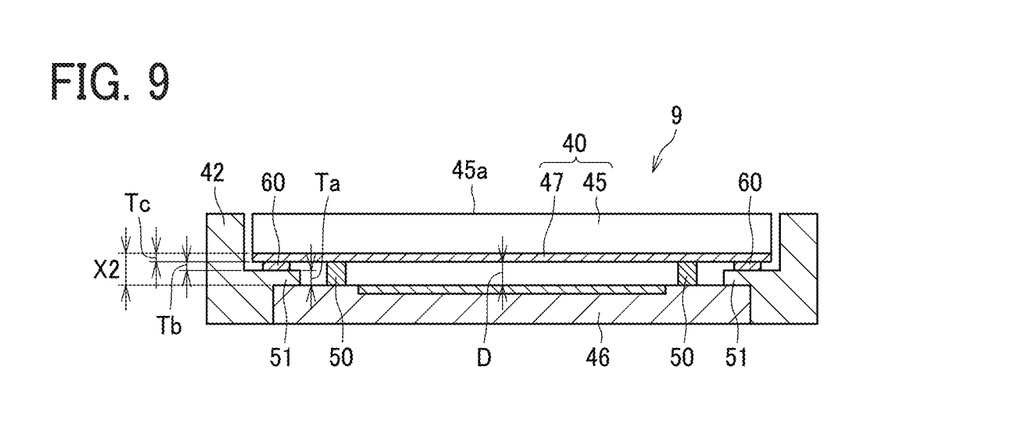
FIG. 9 is a schematic cross-sectional view of an operation panel according to a comparative example.

In general, a sensor sheet is often attached to an entire back surface of a transparent base included in a touch panel. Thus, in the configuration including the spacer 51 like the embodiment of the present disclosure, if the sensor sheet 47 is attached to the entire back surface of the transparent base 45, as illustrated in FIG. 9, the sensor sheet 47 is interposed between the transparent base 45 and the spacer 51. In this case, a distance X2 from the front surface of the liquid crystal panel 46 to the back surface of the transparent base 45 is the sum of the thickness Ta of the spacer 51, a thickness Tb of the double-sided pressure sensitive adhesive tape 60, and a thickness Tc of the sensor sheet 47.

In contrast, in the embodiment of the present disclosure, as illustrated in FIG. 5, the sensor sheet 47 is attached not to the entire back surface of the transparent base 45, but to a portion on a center side other than a portion facing the spacer 51, so that the sensor sheet 47 is not interposed between the transparent base 45 and the spacer 51. In this case, a distance X1 from the front surface of the liquid crystal panel 46 to the back surface of the transparent base is the sum of the thickness Ta of the spacer 51 and the thickness Tb of the double-sided pressure sensitive adhesive tape 60. That is, in the embodiment of the present disclosure, since the sensor sheet 47 is not interposed between the transparent base 45 and the spacer 51, the distance X1 between the transparent base 45 and the liquid crystal panel 46 can be decreased by an amount of the thickness Tc of the sensor sheet 47 as compared to a comparative example illustrated in FIG. 9.

As described above, in the embodiment of the present disclosure, the distance X1 between the transparent base 45 and the liquid crystal panel 46 can be decreased by the amount of the thickness Tc of the sensor sheet 47, and hence the sensor sheet 47 can be made close to the liquid crystal panel 46. Consequently, the distance D between the touch panel 40 and the liquid crystal panel 46 can be decreased as compared to the comparative example illustrated in FIG. 9. Thus, according to the embodiment of the present disclosure, the distance D between the touch panel 40 and the liquid crystal panel 46 can be decreased while the thickness Ta of the spacer 51 is ensured, thereby improving the operability and the visibility while strength and processability of the spacer 51 are maintained.

In the embodiment of the present disclosure, to avoid the sensor sheet 47 from being interposed between the transparent base 45 and the spacer 51, a dimension of the sensor sheet 47 is set as follows. That is, as illustrated in FIG. 5, a width Wa of the sensor sheet 47 is smaller than a distance Wb between one portion of the spacer 51 provided at one portion of the edge of the front cover 42 and another portion of the spacer 51 provided at another portion of the edge of the front cover 42 opposite to the one portion of the edge (Wa<Wb). Since the sensor sheet 47 is formed to be larger than the display area 46a of the liquid crystal panel 46, as illustrated in FIG. 5, the width Wa of the sensor sheet 47 is set to be larger than a width Wc of the display area 46a (Wc<Wa). In this case, the width Wa of the sensor sheet 47, the distance Wb between the one portion and the other portion of the spacer 51, and the width Wc of the display area 46a each represent a width or a distance in a direction parallel to the operation surface 45a of the touch panel 40.

As described above, according to the embodiment of the present disclosure, since the front cover 42 (outer cover) includes the spacer 51 interposed between the touch panel 40 and the liquid crystal panel 46, and since the sensor sheet 47 is not interposed between the transparent base 45 of the touch panel 40 and the spacer 51, improvements in the operability and the visibility can be implemented while a rise of the touch panel 40 is suppressed.

In the above-described embodiment, the example in which the operation display device (operation panel 9) according to the present disclosure is mounted on the electrophotographic image forming apparatus has been described; however, the application of the operation display device according to the present disclosure is not limited to the electrophotographic image forming apparatus. The operation display device according to the present disclosure is also applicable to, for example, an inkjet image forming apparatus.

To summarize the above-described embodiment of the present disclosure, the present disclosure includes at least an operation display device and an image forming apparatus including the following aspects.

First Aspect

In a first aspect, an operation display device includes a touch panel in which, on a back surface of a transparent base having an operation surface in a front surface of the transparent base to which or with which an operation body approaches or comes into contact, an electrostatic capacitance sensor sheet to detect the approach or the contact of the operation body to or with the operation surface is provided; a liquid crystal panel disposed on a back surface side of the touch panel; an outer cover covering a portion of the touch panel other than a front surface of the touch panel; and a sealing member sealing a gap between the touch panel and the liquid crystal panel. The outer cover includes a spacer interposed between the touch panel and the liquid crystal panel. The sensor sheet is disposed so as not to be interposed between the transparent base and the spacer.

Second Aspect

According to a second aspect, in the operation display device of the first aspect, the sensor sheet is formed to be smaller than a distance between one portion of the spacer provided at one portion of an edge of the outer cover and another portion of the spacer provided at another portion of the edge of the outer cover opposite to the one portion of the edge.

Third Aspect

According to a third aspect, in the operation display device of the first aspect or the second aspect, the sensor sheet is formed to be larger than a display area of the liquid crystal panel.

Fourth Aspect

According to a fourth aspect, in the operation display device of any one of the first aspect to the third aspect, the touch panel is secured to the spacer.

Fifth Aspect

According to a fifth aspect, in the operation display device of any one of the first aspect to the fourth aspect, the liquid crystal panel includes a fastened portion fastened to the outer cover so as to be pressed against the spacer.

Sixth Aspect

In a sixth aspect, an image forming apparatus includes an image forming device; and the operation display device of any one of the first aspect to the fifth aspect.

The invention claimed is:

1. An operation display device, comprising:
   a touch panel including a transparent base and an electrostatic capacitance sensor sheet, the transparent base having an operation surface in a front surface of the transparent base to which or with which an operation body approaches or comes into contact, and the electrostatic capacitance sensor sheet being on a back surface of the transparent base to detect the approach or the contact of the operation body to or with the operation surface;
   a liquid crystal panel disposed to face a back surface of the touch panel;
   an outer cover covering a portion of the touch panel other than a front surface of the touch panel; and
   a sealing member, in contact with the touch panel and the liquid crystal panel, to seal a gap between the touch panel and the liquid crystal panel, wherein
   the outer cover includes a spacer interposed between the touch panel and the liquid crystal panel, and
   the electrostatic capacitance sensor sheet is disposed so as not to be interposed between the transparent base and the spacer.

2. The operation display device according to claim 1, wherein the electrostatic capacitance sensor sheet is smaller than a distance between (a) one portion of the spacer provided at one portion of an edge of the outer cover and (b) another portion of the spacer provided at another portion of the edge of the outer cover opposite to the one portion of the edge.

3. The operation display device according to claim 1, wherein the electrostatic capacitance sensor sheet is larger than a display area of the liquid crystal panel.

4. The operation display device according to claim 1, wherein the touch panel is secured to the spacer.

5. The operation display device according to claim 1, wherein the liquid crystal panel includes a piece fastened to the outer cover and pressed against the spacer.

6. An image forming apparatus, comprising:
   an image forming device to form an image on a recording medium; and
   the operation display device according to claim 1, configured to receive a user operation to the image forming device.

7. The operation display device according to claim 1, wherein the sealing member is a sponge.

8. The operation display device according to claim 1, wherein the sealing member includes an elastic material.

9. The operation display device according to claim 1, wherein the spacer is in contact with the touch panel and the liquid crystal panel.

10. An operation display device, comprising:
    a touch panel including a transparent base and an electrostatic capacitance sensor sheet, the transparent base having an operation surface in a front surface of the transparent base to which or with which an operation body approaches or comes into contact, and the electrostatic capacitance sensor sheet being on a back surface of the transparent base to detect the approach or the contact of the operation body to or with the operation surface;
    a liquid crystal panel disposed to face a back surface of the touch panel;
    an outer cover covering a portion of the touch panel other than a front surface of the touch panel; and
    a sealing member sealing a gap between the touch panel and the liquid crystal panel, wherein
    the outer cover includes a spacer which is in contact with, and interposed between, the touch panel and the liquid crystal panel, and
    the electrostatic capacitance sensor sheet is disposed so as not to be interposed between the transparent base and the spacer.

11. The operation display device according to claim 10, wherein the electrostatic capacitance sensor sheet is smaller than a distance between (a) one portion of the spacer provided at one portion of an edge of the outer cover and (b) another portion of the spacer provided at another portion of the edge of the outer cover opposite to the one portion of the edge.

12. The operation display device according to claim 10, wherein the electrostatic capacitance sensor sheet is larger than a display area of the liquid crystal panel.

13. The operation display device according to claim 10, wherein the touch panel is secured to the spacer.

14. The operation display device according to claim 10, wherein the liquid crystal panel includes a piece fastened to the outer cover and pressed against the spacer.

15. An image forming apparatus, comprising:
    an image forming device to form an image on a recording medium; and
    the operation display device according to claim 10, configured to receive a user operation to the image forming device.

16. The operation display device according to claim 10, wherein the sealing member is a sponge.

17. The operation display device according to claim 10, wherein the sealing member includes an elastic material.

* * * * *